Jan. 11, 1955   H. C. DRAKE   2,699,061
HIGH-SPEED ULTRASONIC INDICATOR
Filed Oct. 5, 1950   4 Sheets-Sheet 1

INVENTOR.
HARCOURT C. DRAKE
BY
Joseph H. Lipschutz
ATTORNEY.

Jan. 11, 1955  H. C. DRAKE  2,699,061
HIGH-SPEED ULTRASONIC INDICATOR
Filed Oct. 5, 1950  4 Sheets-Sheet 4

INVENTOR.
HARCOURT C. DRAKE
BY
*Joseph H. Lifschutz*
ATTORNEY.

2,699,061
                                    Patented Jan. 11, 1955

2,699,061

HIGH-SPEED ULTRASONIC INDICATOR

Harcourt C. Drake, Hempstead, N. Y., assignor to Sperry Products, Inc., Danbury, Conn., a corporation of New York Application October 5, 1950, Serial No. 188,536

5 Claims. (Cl. 73—67)

This invention relates to the testing or inspection of objects by ultrasonic detection means wherein the ultrasonic search unit is moved relative to the object in order to scan a length of bar, plate, rail or the like or the circumference of a circular section such as a pipe. In such inspection systems many false indications appear momentarily on the indicator due to faulty contact and various other operating conditions. Such indications are distinct from those indications due to an internal defect because such indications continue to appear for a period of time while the search unit is approaching them. A major problem in such testing systems is to distinguish between the many instantaneous false indications and the true indications of defects which endure for a relatively long period of time. It is one of the principal objects of this invention to provide means for making such distinction.

It is a further object of this invention not merely to distinguish between true and false indications of defects, but to provide means which will make such discrimination quickly so as to permit relatively rapid movement of the search unit over an object to be tested.

Further objects and advantages of this invention will become apparent in the following detailed description thereof.

In the accompanying drawings.

Figure 1:
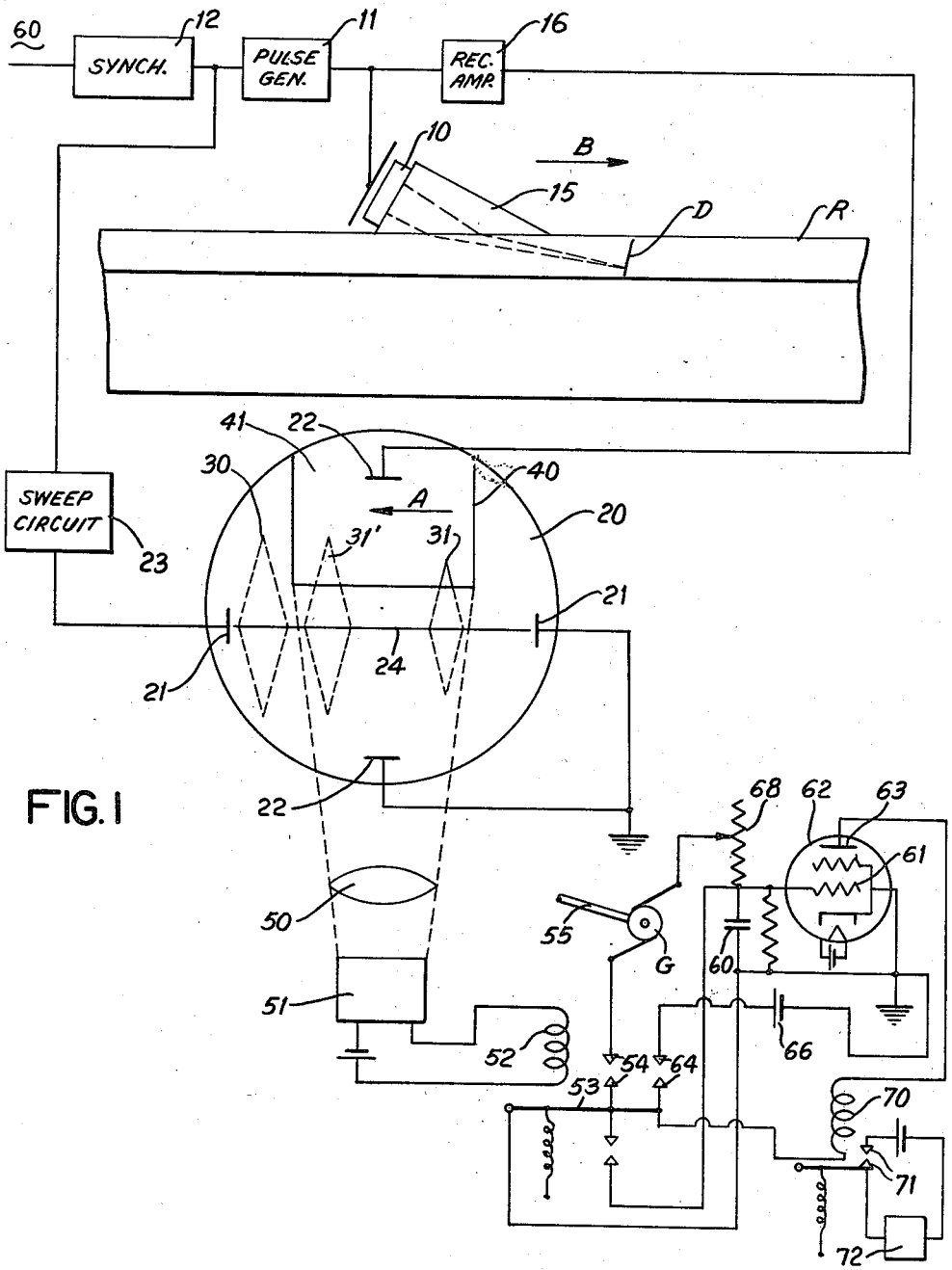
Fig. 1 is a view comprising for the most part a wiring diagram of one form of this invention as shown applied to the testing of a rail.

Referring first to Fig. 1 of the drawings I have shown my invention as applied to the continuous testing of a rail R although it will be readily apparent from the following description that the invention is capable of application to other objects such as plates, bars, pipes and the like. In this form of the invention there is shown an electro-acoustic transducer which may be a piezo-electric element 10 in the form of a quartz crystal adapted to be energized periodically by wave trains or pulses generated by a pulse generator 11 which may be periodically energized by a synchronizer 12 which in turn may derive its power from any pulsating or oscillating source such as 60-cycle A. C. Thus sixty times each second the crystal 10 will transmit pulses into the object under inspection, in this case the rail R. To facilitate transmission of pulses into the object at any desired angle the crystal may be mounted upon a suitable wedge-shaped support 15 which may be formed of any material of low acoustic impedance. The transmitted beams will be refracted on striking the object and will travel through the object until it meets a reflecting surface such as a fissure D. Such reflecting surface will reflect the vibrations back toward the crystal. It will be understood that the electric oscillations applied to crystal 10 will be changed into mechanical vibrations by the crystal 10, whereas the mechanical vibrations received by the crystal from a reflecting surface such as defect D will be reconverted into electric oscillations. The voltages generated by, and applied to, crystal 10 may be indicated on any suitable form of indicator after being amplified by receiver amplifier 16. One form of indicator usually employed is an oscilloscope 20 having horizontal plates 21 and vertical plates 22. A sweep circuit 23 applies a sweep between the horizontal plates 21 in synchronism with the pulses generated by pulse generator 11 because of the common synchronizer 12. Thus each time a pulse is generated a sweep is started between the horizontal plates, the length of sweep representing a time interval and therefore a certain distance of travel of the pulse. Since the pulse and sweep are generated simultaneously the initial pulse 30 will appear at the beginning of the sweep. When a defect such as D first begins to reflect the transmitted pulses the received reflected pulse 31 will appear a maximum distance away from the indication of pulse 30 on the sweep. As the search unit is moved along closer and closer to defect D the indication 31 will appear to move along the sweep in the direction of arrow A closer and closer to the indication 30 of the transmitted pulse. Thus indication 31 will eventually show up at the other side of the sweep at 31' having moved along the sweep in the direction of arrow A while the search unit has moved in the direction of arrow B.

In the course of the movement of the indication 31 along the sweep in the direction of arrow A it will be found that a large number of false indications of short duration will appear and disappear. It is sometimes difficult when the search unit is moving fast to distinguish between these false indications and true indications of a defect. By this invention I utilize the hereinbefore described distinction between these false indications and true indications of defects, i. e., the fact that false indications are of short duration while true indications endure for a relatively long time interval to actuate indicating means which would be responsive only to the relatively long duration true indications.

One such solution is disclosed in Fig. 1. In this form of the invention the indicating means is assumed to be an oscilloscope. A shield 40 is provided on the face of the oscilloscope and is designed to blot out from view the indication of the original pulse 30 as well as the sweep 24. Therefore the only indications of light which will appear in the open space 41 are those due to defects. Such indications are produced in response to reflections received by crystal 10 and converted into electric voltages which after being amplified by receiver amplifier 16 are applied to the vertical plates 22 to cause vertical deviations of the horizontal sweep which show up in the form of indications 30 and 31. False indications will also appear in the form of vertical deviations of the sweep and will be seen in area 41 as light spots but these are of short duration whereas a defect like D will yield an indication 31 that moves completely across the area 41 in the direction of arrow A as the search unit moves toward the defect in the direction of arrow B. In the following description there is disclosed one form of mechanism for utilizing this distinction to operate an indicator or similar mechanism only in response to indications of true defects.

For this purpose there is mounted in front of opening 41 in shield 40 an optical system, shown diagrammatically at 50, and photo-cell 51, the optical system serving to focus any light appearing in opening 41 upon the photo-cell to render the latter conductive. Such light spot, as for instance the spot 31 caused by defect D, will energize the photo-cell 51 to energize an electromagnet 52 which will attract its armature 53 to close a set of contacts 54 and thus close the circuit through a generator G which may be driven in some manner at a speed proportional to the speed of movement of the search unit in the direction B. Thus if the search unit is mounted on a moving car, the shaft 55 of generator G may be geared to the axle of the car. Thus there will be generated a voltage which is a function of the rate of movement of the search unit and this voltage will charge a capacitor 60 to place a voltage upon the grid 61 of a tube 62. The plate 63 of the tube may be provided with voltage at the same time by closure of contacts 64 simultaneously with contacts 54 to permit a voltage source such as battery 66 to energize plate 63. The rate of charging of capacitor 60 may be controlled by variable resistor 68 so that if the light spot 31 is continuously within the space 41 from the position shown in full lines at 31 until it reaches the dotted line position 31', the generator G will place sufficient charge on capacitor 60 which in turn will place a sufficient voltage on grid 61 to render the tube conductive and thus energize coil 70 to close a set of contacts 71 which will close a circuit through any suitable form of indicator 72 which may be visible or audible or which may be an automatic reject mechanism. If, however, a transient, short-duration light signal appears in space 41, it will energize generator G, but for an insufficient interval to render the tube 62 conductive and therefore will not operate the final actuated member 72. In this manner distinction is made between true and false indications.

Figure 2:
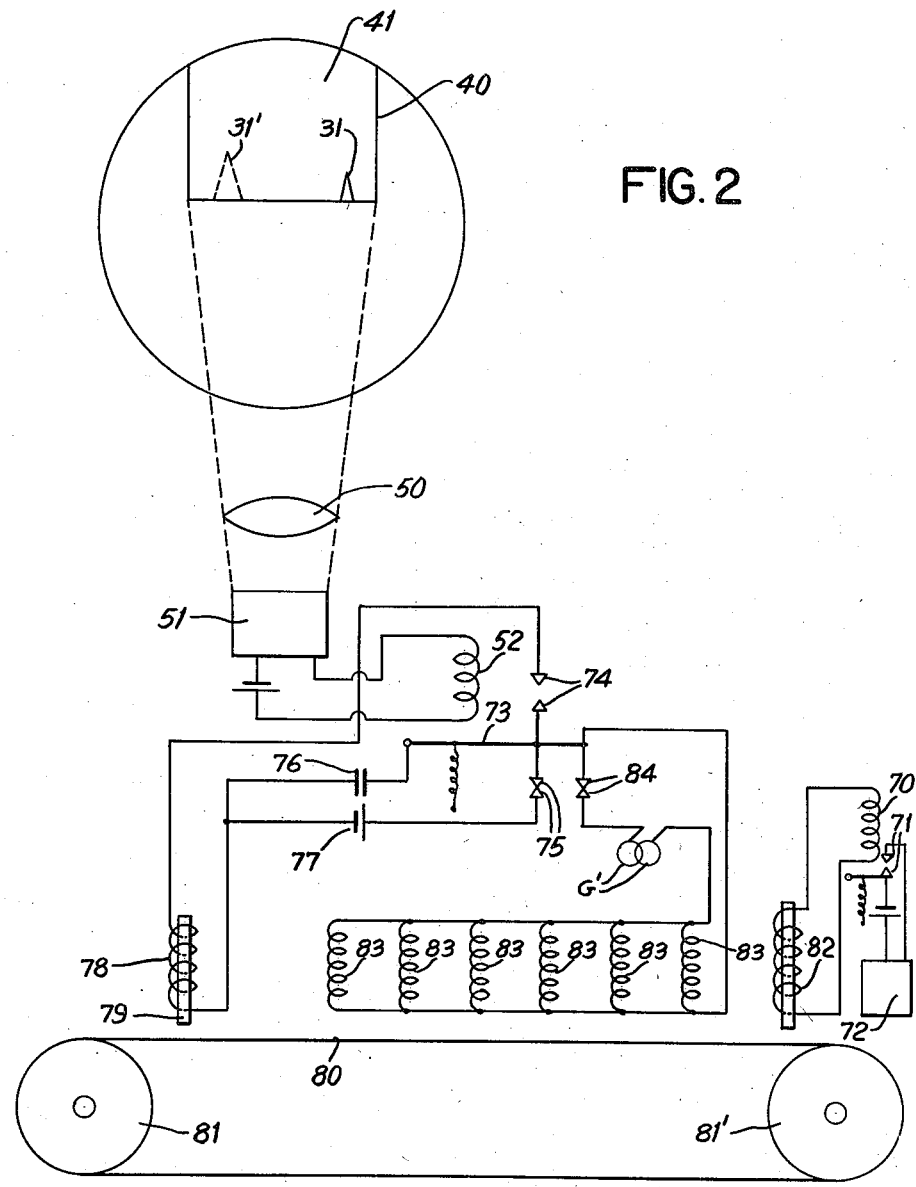
Fig. 2 is a view similar to Fig. 1 of a modified form of this invention.

In a modified form of the invention shown in Fig. 2 a shield 40 is again provided and an optical system 50 detects any light appearing in the open area 41 to focus the same on photo-cell 51 to render the coil 52 effective to attract its armature 73 and close a set of contacts 74. At the same time that contacts 74 are closed a set of contacts 75 is opened to break a circuit which includes capacitor 76 and source of voltage 77. Normally with contacts 75 closed capacitor 76 is charged, but when coil 52 is energized to open contacts 75 and close contacts 74 the charge on capacitor 76 is discharged through a coil 78 having a core 79 to magnetize a localized area of a magnetizable tape 80 operating over rollers 81 and 82 at least one of which is driven at a rate proportional to the rate of movement of the search unit. Thus when a light spot such as 31 appears in area 41 a small magnetized area will appear on tape 80 and will be carried along for a distance corresponding to the movement of said indication 31 to position 31' at which point the magnetized area of tape 80 will energize a coil 82 to energize a coil 70 to close contacts 71 to close the circuit through the final signal or actuated member 72. A series of erasing coils 83 is provided along the length of the tape between coils 79 and 82 so that if at any time after impressor coil 78 places a magnetized spot on tape 80, and before such spot reaches pick-up coil 82, the indication in area 41 is extinguished, the magnetized spot on tape 80 will be erased. To accomplish this result there is provided on armature 73 another set of contacts 84 which will be closed whenever coil 52 is de-energized to permit a generator G' to energize the erasing coils 83 and thus wipe out the magnetic spot before it reaches pick-up coil 82. In this manner only a light spot which persists for the whole time that the magnetic impressed spot travels from impressor position 79 to pick-up position 82 will actuate the final indicator or actuated means 72, but if such light spot does not persist for such length of time which corresponds to the movement of the light spot across open area 41 the magnetic area is wiped out prior to reaching pick-up coil 82 and the final mechanism 72 will not be actuated.

Figure 3:
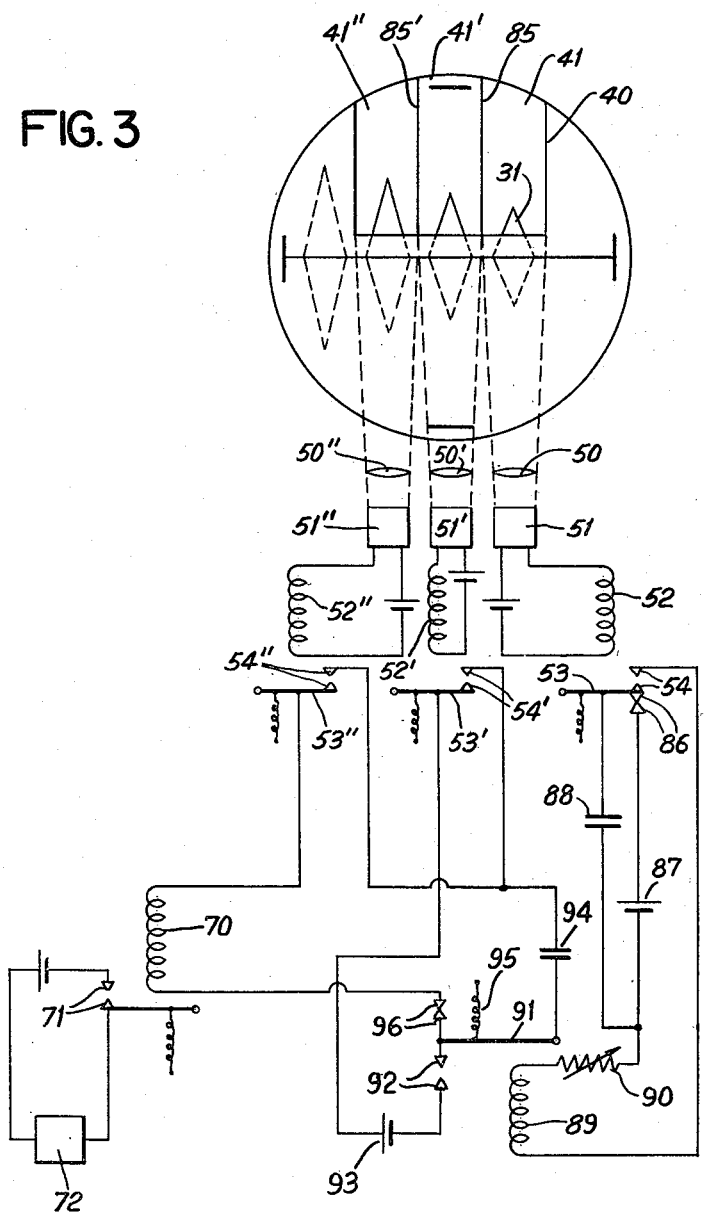
Fig. 3 is a view similar to Fig. 2 of still another modification of this invention.

In the Fig. 3 form of the invention a light shield 40 is again provided but the area 41 is subdivided into three areas 41, 41' and 41" by means of partitions 85 and 85'. Separate optical systems 50, 50' and 50" cooperate with photo-cells 51, 51' and 51" whose outputs energize coils 52, 52' and 52". As a light spot 31 moves into area 41 coil 52 is energized to attract its armature 53 to close contacts 54 and open contacts 86. The opening of contacts 86 breaks a normally closed circuit in which a source of voltage 87 normally charges a capacitor 88. When contacts 86 are open and contacts 54 are closed the charge on capacitor 88 is discharged through a coil 89 at a rate determined by variable resistor 90. This energizes coil 89 which attracts its armature 91 to close a set of contacts 92 in a circuit which includes a source of voltage 93, a capacitor 94 and the contacts 54'. The capacitor 88 will maintain coil 89 energized and contact 92 closed for a time sufficient to enable indication 31 to move from area 41 into area 41'. When indication 31 appears in area 41' contacts 54' are closed and voltage source 93 charges capacitor 94. The charging continues as the indication 31 moves out of compartment 41', at which point contacts 54' open, contacts 92 are broken and a spring return 95 closes contacts 96 in a circuit which includes coil 70 and contacts 54". If the indication now moves into compartment 41" then coil 52" is energized to close contacts 54" and thus close the circuit through coil 70 to permit capacitor 94 to discharge through said coil. This will close contacts 71 which will close the circuit through the final indicator or actuated mechanism 72. It will thus be seen that a temporary light spot which does not move progressively from compartment 41 to compartment 41' to compartment 41" in the time determined by the constants of the circuit which are set to correspond to the rate of movement of the search unit, the indicator 72 will not be actuated.

Figure 4:
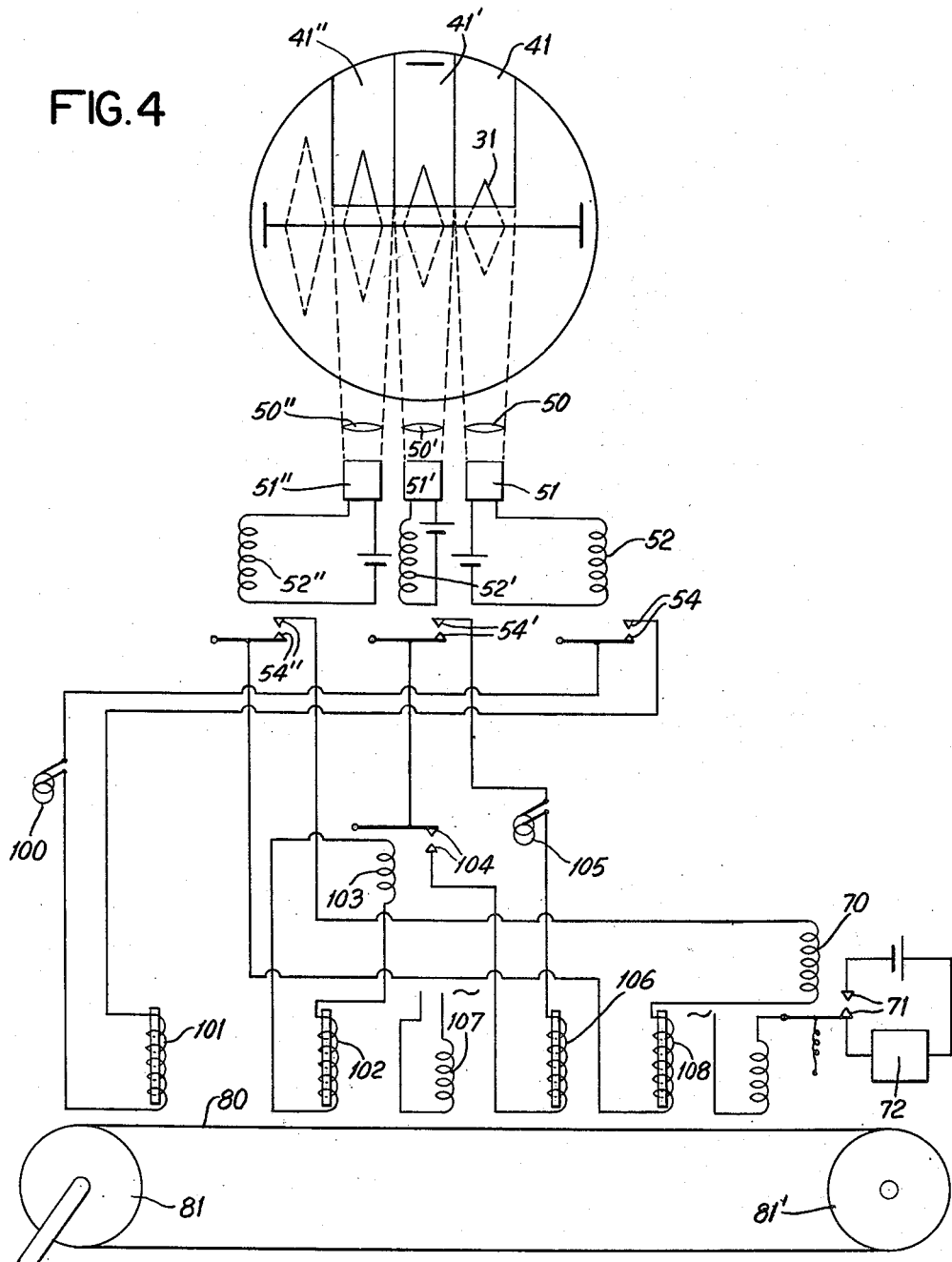
Fig. 4 is a view similar to Fig. 3 but showing a modification thereof.

In a modification of the Fig. 4 form of the invention the appearance of light spot 31 in compartment 41 energizes coil 52 to close contacts 54 and energize a circuit comprising a generator 100 to place an alternating current flux on an impressor coil 101 to impress a magnetic spot on a magnetizable tape 80 operating over rollers 81, 81', one of which is driven at a speed corresponding to the rate of movement of the search unit. The magnetic spot thus impressed on the tape moves under a pick-up coil 102 to energize a coil 103 which will close a set of contacts 104 in a circuit which includes the contacts 54', a flux generator 105 and an impressor coil 106. If by the time the flux spot moves under the pick-up coil 102, the light spot 31 has moved into compartment 41', contacts 54' will be closed and impressor coil 106 will be energized to impress a second magnetizable spot on the tape 80. In the meantime the first spot which has passed pick-up coil 102 will have been erased by erasing coil 107. The second magnetic spot impressed on tape 80 by impressor coil 106 will be picked up by pick-up coil 108 in a circuit which includes contacts 54" and coil 70. If when the second magnetic spot has moved under pick-up coil 108, the light spot 31 has moved into compartment 41", contacts 54" will be closed and coil 70 will be energized to close contacts 71 in the circuit of the final indicator or actuated mechanism 72. Thus it will be seen that only if the light spot persists throughout the travel from compartment 41 to compartment 41' to compartment 41" will the final indicator 72 be actuated.

Having described my invention, what I claim and desire to secure by Letters Patent is:

1. In the inspection of objects by ultrasonic pulses including means for periodically generating electrical pulses, an electro-acoustic transducer adapted to be moved over the object, means for applying the generated pulses to the transducer, said transducer serving to transmit mechanical vibrations into the object at an angle in the same general direction as the transducer movement and to receive reflections of said vibrations from reflecting surfaces within the object, and an oscilloscope for visually indicating the transmitted pulses and the reflections thereof, said oscilloscope having a single sweep and means for masking the sweep and the indication of the transmitted pulse, said received reflections from reflecting surfaces being of relatively long duration, said transducer receiving also other vibrations of relatively short duration, the improvement which is characterized by light responsive means rendered effective by the indications of said indicating means, voltage generating means rendered effective by said responsive means as long as said responsive means is rendered effective by an indication, means for actuating said voltage generating means as a function of the movement of said transducer, and actuatable means rendered effective by said voltage generating means after a predetermined degree of energization of said voltage generating means.

2. A device as specified in claim 1, in which the means for rendering the actuatable means effective includes a tube having cathode, anode and grid, said generated voltage being applied to the grid of the tube so that a predetermined voltage generated by said voltage generating means will render said tube conductive, and means rendered effective when said tube becomes conductive for actuating said actuatable mechanism.

3. In the inspection of objects by ultrasonic pulses including means for periodically generating electrical pulses, an electro-acoustic transducer adapted to be moved over the object, means for applying the generated pulses to the transducer, said transducer serving to transmit mechanical vibrations into the object at an angle in the same general direction as the transducer movement and to receive reflections of said vibrations from reflecting surfaces within the object, and an oscilloscope for visually indicating the transmitted pulses and the reflectors thereof, said oscilloscope having a single sweep and means for masking the sweep and the indication of the transmitted pulse, said received reflections from reflecting surfaces being of relatively long duration, said transducer receiving also other vibrations of relatively short duration, the improvement which is characterized by light-responsive means rendered effective by the indications of said indicating means, means rendered effective by said light-responsive means comprising an impressor coil, a source of voltage for energizing said coil, a magnetizable tape movable as a function of the movement of said transducer relative to the object and adapted to be magnetized by the energized coil, a pick-up coil cooperating with the tape and spaced from the impressor coil a predetermined distance, flux erasing means cooperating with said tape and positioned between the impressor coil and pick-up coil, means for energizing said flux erasing means when said impressor coil is de-energized, an actuatable mechanism, and means whereby the flux generated in the pick-up coil actuates said actuatable mechanism.

4. In the inspection of objects by ultrasonic pulses including means for periodically generating electrical pulses, an electro-acoustic transducer adapted to be moved over the object, means for applying the generated pulses to the transducer, said transducer serving to transmit mechanical vibrations into the object at an angle in the same general direction as the transducer movement and to receive reflections of said vibrations from reflecting surfaces within the object, and an oscilloscope for visually indicating the transmitted pulses and the reflections thereof, said oscilloscope having a single sweep and means for masking the sweep and the indication of the transmitted pulse, said received reflections from reflecting surfaces being of relatively long duration, said transducer receiving also other vibrations of relatively short duration, the improvement which is characterized by means for subdividing the unblocked area of the oscilloscope into a plurality of separate compartments along the length of the sweep, light-responsive means cooperating with each compartment, a circuit rendered effective by the light responsive means in response to an indication appearing in an end compartment, a circuit for each light-responsive means cooperating with succeeding compartments, means actuated by each circuit for placing the succeeding circuit in condition to be rendered effective when the respective light-responsive means for the succeeding compartment is energized, each circuit being adapted to remain effective for a predetermined time relative to the rate of travel of the transducer along the object sufficient to permit an indication to travel along the sweep into a succeeding compartment and energize the respective responsive means to render the respective circuit effective, an actuatable mechanism, and means whereby rendering the final circuit effective actuates said actuatable mechanism.

5. In the inspection of objects by ultrasonic pulses including means for periodically generating electrical pulses, an electro-acoustic transducer adapted to be moved over the object, means for applying the generated pulses to the transducer, said transducer serving to transmit mechanical vibrations into the object at an angle in the same general direction as the transducer movement and to receive reflections of said vibrations from reflecting surfaces within the object, and an oscilloscope for visually indicating the transmitted pulses and the reflections thereof, said oscilloscope having a single sweep and means for masking the sweep and the indication of the transmitted pulse, said received reflections from reflecting surfaces being of relatively long duration, said transducer receiving also other vibrations of relatively short duration, the improvement which is characterized by means for subdividing the unblocked area of the oscilloscope into a plurality of separate compartments along the length of the sweep, light-responsive means cooperating with each compartment, a magnetic tape movable as a function of the rate of movement of the transducer along the object, flux impressor coils spaced along the tape, each coil cooperating with a respective light-responsive means, means for causing the first impressor coil to energize the tape with flux in response to energization of the light-responsive means cooperating with an end compartment, a circuit including a pick-up coil energized by said magnetized tape for placing the succeeding impressor coil circuit including another of said impressor coils in condition to be rendered effective when the respective light-responsive means for the succeeding compartment is rendered effective, a final pick-up coil, an actuatable mechanism, means whereby the final pick-up coil when energized by flux in the magnetic tape actuates said actuatable mechanism, and flux erasing means cooperating with the tape and positioned after each pick-up coil.

References Cited in the file of this patent
UNITED STATES PATENTS

| Number | Name | Date |
|---|---|---|
| 1,858,931 | Langevin et al. | May 17, 1932 |
| 1,988,658 | Kovalsky | Jan. 22, 1935 |
| 2,144,337 | Koch | Jan. 17, 1939 |
| 2,378,388 | Begun | June 19, 1945 |
| 2,481,515 | Isbister | Sept. 13, 1949 |
| 2,527,986 | Carlin | Oct. 31, 1950 |
| 2,562,449 | De Lano, Jr. | July 31, 1951 |
| 2,603,966 | Drake | July 22, 1952 |